US012267424B2

(12) United States Patent
Liu

(10) Patent No.: US 12,267,424 B2
(45) Date of Patent: Apr. 1, 2025

(54) ENSURING REPLACEMENT OF A MEMORY DEVICE KEY

(71) Applicant: Micron Technology, Inc., Boise, ID (US)

(72) Inventor: Zhan Liu, Cupertino, CA (US)

(73) Assignee: Micron Technology, Inc., Boise, ID (US)

( * ) Notice: Subject to any disclaimer, the term of this patent is extended or adjusted under 35 U.S.C. 154(b) by 563 days.

(21) Appl. No.: 17/503,222

(22) Filed: Oct. 15, 2021

(65) Prior Publication Data

US 2023/0122962 A1 Apr. 20, 2023

(51) Int. Cl.
*H04L 9/08* (2006.01)
*H04L 9/30* (2006.01)
*H04L 9/32* (2006.01)

(52) U.S. Cl.
CPC ............... *H04L 9/088* (2013.01); *H04L 9/30* (2013.01); *H04L 9/3242* (2013.01); *H04L 9/3247* (2013.01)

(58) Field of Classification Search
CPC ......... H04L 9/088; H04L 9/30; H04L 9/3242; H04L 9/3247
See application file for complete search history.

(56) References Cited

U.S. PATENT DOCUMENTS

| 5,113,518 A | * | 5/1992 | Durst, Jr. ................ G06F 21/12 726/29 |
| 6,240,187 B1 | * | 5/2001 | Lewis ................ G06Q 20/3829 380/282 |
| 10,454,689 B1 | * | 10/2019 | Sharifi Mehr ........ H04L 63/166 |
| 11,184,157 B1 | * | 11/2021 | Gueron ..................... H04L 9/14 |
| 2008/0069347 A1 | * | 3/2008 | Brown .................. H04L 9/3066 380/45 |
| 2010/0174909 A1 | * | 7/2010 | Ashdown .................. H04L 9/14 713/181 |
| 2020/0213085 A1 | * | 7/2020 | Fletcher .............. G06Q 20/3829 |
| 2021/0143990 A1 | * | 5/2021 | Ruane ................... H04L 9/0891 |

* cited by examiner

*Primary Examiner* — Vance M Little
(74) *Attorney, Agent, or Firm* — Greenberg Traurig

(57) ABSTRACT

The disclosed embodiments are directed to preventing the writing of malformed cryptographic keys to a memory device. In one embodiment, a system is disclosed comprising a storage array, the storage array storing a first cryptographic key; and a processor configured to: receive a command from a host processor, the command including a second cryptographic key, a first signature, a second signature, and at least one field, determine that the first signature is valid using the second cryptographic key and the at least one field, determine that the second signature is valid using the first cryptographic key, the first signature and the at least one field, and replace the first cryptographic key with the second cryptographic key after determining that both the first signature and second signature are valid.

20 Claims, 7 Drawing Sheets

ENSURING REPLACEMENT OF A MEMORY DEVICE KEY

FIELD OF THE TECHNOLOGY

At least some embodiments disclosed herein relate generally to semiconductor devices and, in particular, to improving updates to Flash memory devices.

BACKGROUND

Some memory devices may store cryptographic keys to perform cryptographic operations. During updates of these keys, memory devices do not protect against logical errors in keys (e.g., malformed keys). If an invalid key is written to a memory device, the memory device may be non-functional and require physical resetting, which may be impossible.

DETAILED DESCRIPTION

Figure 1:
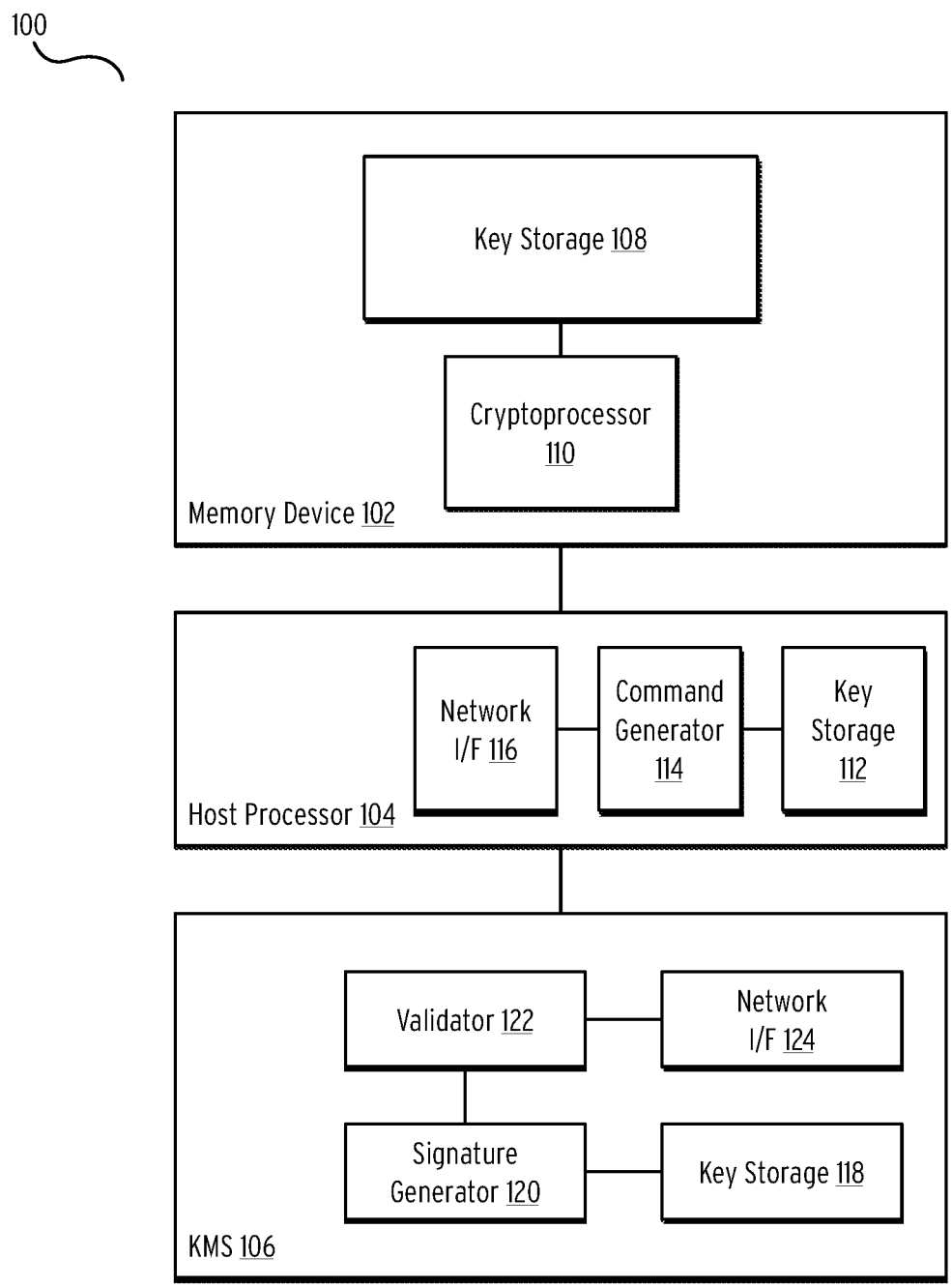
FIG. 1 is a block diagram of a network system according to some of the example embodiments.

The example embodiments describe techniques for ensuring that a key is properly replaced in a memory device. In the example embodiments, a memory device can store a cryptographic key such as a public key of an asymmetric key pair and use this key to verify signatures and perform other operations. For example, during manufacturing, a manufacturer may write a public key to the memory device. The memory device can use this public key to validate firmware updates signed with the corresponding manufacturer's private key. In some scenarios, an owner of the memory device may wish to replace the public key with their own public key. However, various issues may arise during this replacement. For example, if the new public key is malformed or otherwise incorrect, overwriting a valid key will result in a non-functional device (e.g., one that cannot validate signatures). Thus, current memory devices would need to be manually reset to a default state in such a scenario. This resetting may be inconvenient or impossible in certain settings.

The example embodiments remedy this deficiency by providing an improved replacement command and procedure for ensuring that a new key is valid before overwriting an existing key. In brief, a replacement command includes a new public key and is signed using a corresponding private key, the signature being added to an interim command. The interim command is then signed by the owner of the currently active public key to ensure that the command is allowed. Only when both signatures are validated does the memory device persist the new key, thus ensuring only a valid and authorized key is used to overwrite an existing key.

In an embodiment, a memory device is disclosed including a storage array, the storage array storing a first cryptographic key; and a processor. In this embodiment, the processor is configured to receive a command from a host processor, the command including a second cryptographic key, a first signature, a second signature, and at least one field, determine that the first signature is valid using the second cryptographic key and the at least one field, determine that the second signature is valid using the first cryptographic key, the first signature and the at least one field, and replace the first cryptographic key with the second cryptographic key after determining that both the first signature and second signature are valid.

In another embodiment, a method is disclosed that includes storing, in a storage array, a first cryptographic key; receiving a command from a host processor, the command including a second cryptographic key, a first signature, a second signature, and at least one field; determining that the first signature is valid using the second cryptographic key and the at least one field; determining that the first signature is valid comprises computing a first hash using the second cryptographic key and the at least one field, decrypting the first signature using the second cryptographic key to generate a second hash, and determining that the first signature is valid when the first hash and second hash are equal.

In another embodiment, a non-transitory computer-readable storage medium for tangibly storing computer program instructions capable of being executed by a computer processor. In this embodiment, the computer program instructions can define the steps of storing, in a storage array, a first cryptographic key; receiving a command from a host processor, the command including a second cryptographic key, a first signature, a second signature, and at least one field; determining that the first signature is valid using the second cryptographic key and the at least one field; determining that the second signature is valid using the first cryptographic key, the first signature and the at least one field; and replacing the first cryptographic key with the second cryptographic key after determining that both the first signature and second signature are valid.

In an embodiment, determining that the second signature is valid includes computing a first hash using the second cryptographic key, the at least one field, and the first signature, decrypting the second signature using the first cryptographic key to generate a second hash, and determining that the second signature is valid when the first hash and second hash are equal.

Some embodiments are further configured to return an error code after determining that either the first signature is invalid or the second signature if invalid. Some embodiments are further configured to prevent overwriting of the first cryptographic key after returning the error code. In some embodiments, the error code indicates whether the first signature or the second signature is invalid. In some embodiments, the first cryptographic key includes a first public key, and the second cryptographic key includes a second public key. In some embodiments, the first signature and second signature are validated using an Elliptic Curve Digital Signature Algorithm (ECDSA).

FIG. 1 is a block diagram of a network system according to some of the example embodiments.

A network system 100 includes a memory device 102, host processor 104, and key management server (KMS 106). The memory device 102 can include a cryptoprocessor 110 and key storage 108. The memory device 102 can include additional components such as those discussed in FIG. 5. The host processor 104 can include a key storage 112, command generator 114, and network interface 116. The host processor 104 can include additional components such as those discussed in FIG. 6. The KMS 106 can include a key storage 118, signature generator 120, validator 122, and network interface 124.

In the illustrated embodiment, the memory device 102 can comprise any persistent memory device such as a Flash storage device or other solid-state storage devices. The memory device 102 can include a storage array or other type of storage partition that persistently stores data. As illustrated, this storage array can include a key storage 108. In some embodiments, the key storage 108 can comprise a dedicated area of a larger storage array. In other embodiments, the key storage 108 can comprise a smaller dedicated storage area. In some embodiments, the key storage 108 can be write-protected and only writeable via a secure command In an embodiment, a secure command comprises a signed command. In some embodiments, the signed command includes a signature generated using a key corresponding to a key stored in key storage 108. In an embodiment, the signature is generated using a private key corresponding to a public key stored in key storage 108. In some embodiments, key storage 108 can store multiple keys (e.g., public keys). In some embodiments, the key storage 108 can store a manufacturer-generated public key upon being released from manufacturing. In an embodiment, the memory device 102 supports commands allowing for the updating of keys stored in key storage 108.

In an embodiment, a controller (not illustrated) can receive and process commands, including a replace key command. In some embodiments, the controller can offload cryptographic operations to cryptoprocessor 110. Examples of cryptographic operations include signature validation, hash calculations, random number generation, encryption, decryption, etc. In some embodiments, a controller can forward a signed command to cryptoprocessor 110 for signature validation. In an embodiment, the cryptoprocessor 110 can validate a signature included in a command using a public key stored in key storage 108. Various digital signature algorithms such as Rivest-Shamir-Adleman (RSA), Digital Signature Algorithm (DSA), Elliptic Curve Digital Signature Algorithm (ECDSA), or Edwards-curve Digital Signature Algorithm (EdDSA) algorithms can be used.

Figure 5:
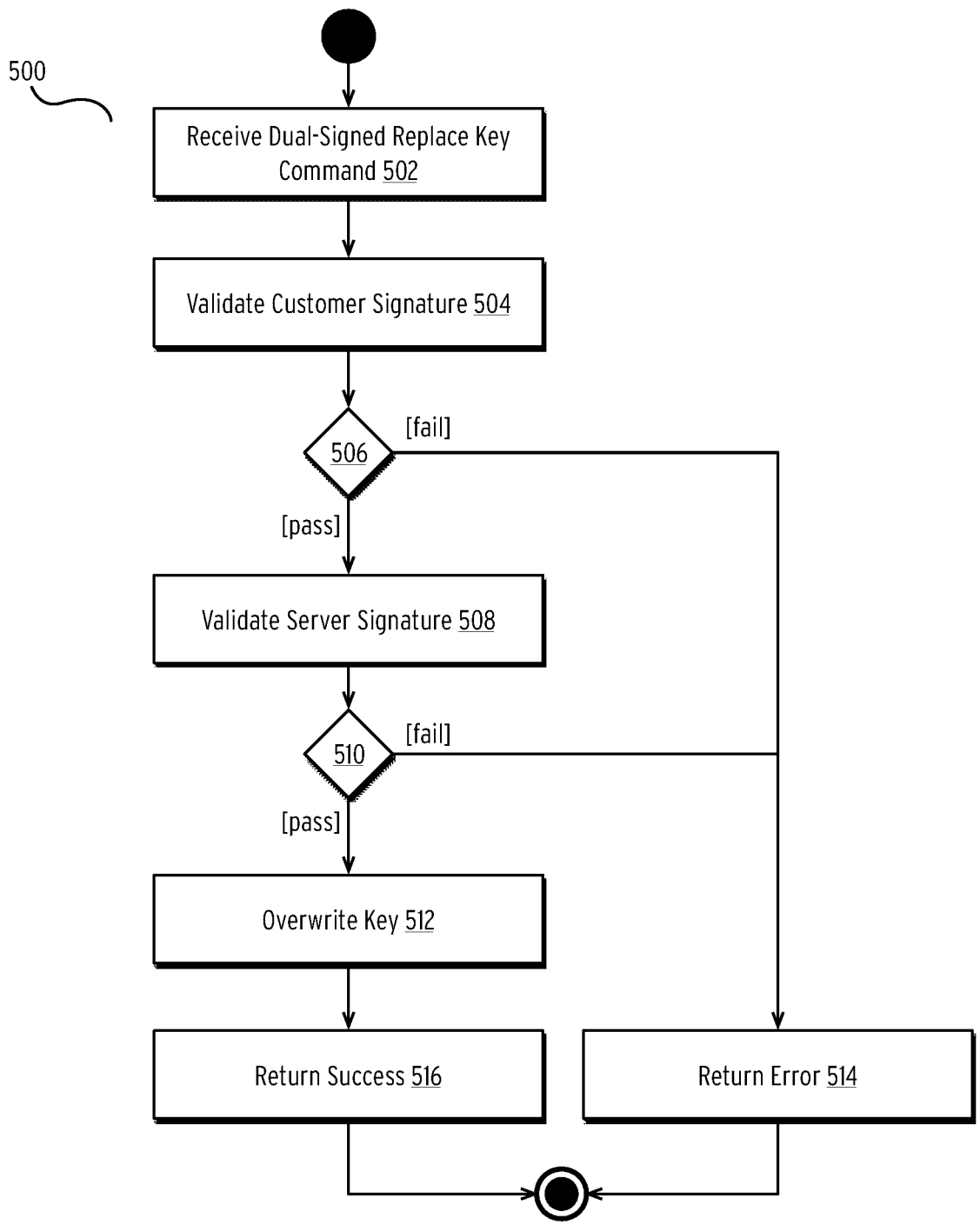
FIG. 5 is a flow diagram illustrating a method for validating a replace key command at a memory device according to some of the example embodiments.

As discussed in more detail in FIG. 5, the memory device 102 can receive a dual-signed replace key command from a host processor 104. The controller can forward the dual-signed replace key command to the cryptoprocessor 110 for signature validation. In response, the cryptoprocessor 110 can verify a customer signature using a public key included in the command and at least one other field. Next, the cryptoprocessor 110 can validate a server signature using a public key stored in key storage 108 and the contents of the command. When both signature validations pass, the cryptoprocessor 110 can either persist the public key included in the dual-signed replace key command to the key storage 108 or return a validation result to the controller, wherein the controller can persist the public key in the dual-signed replace key command to the key storage 108. In either scenario, the memory device 102 will then return a status code indicating whether the write was successful or not. In some embodiments, the memory device 102 can return an error code to host processor 104 when a signature validation fails. In some embodiments, the error code can indicate whether the client-generated signature or the server-generated signature is invalid. For example, the error code can indicate that the client-provided signature was invalid. In such a scenario, the customer-provided public key used to validate the client-generated signature may be corrupted or otherwise malformed. Thus, the host processor 104 can use this error code to trigger a new key generation process or otherwise handle such an error condition. If, however, the error code indicates that the server signature validation failed, such an error code may indicate that the host processor 104 is not authorized to change a key.

Figure 3:
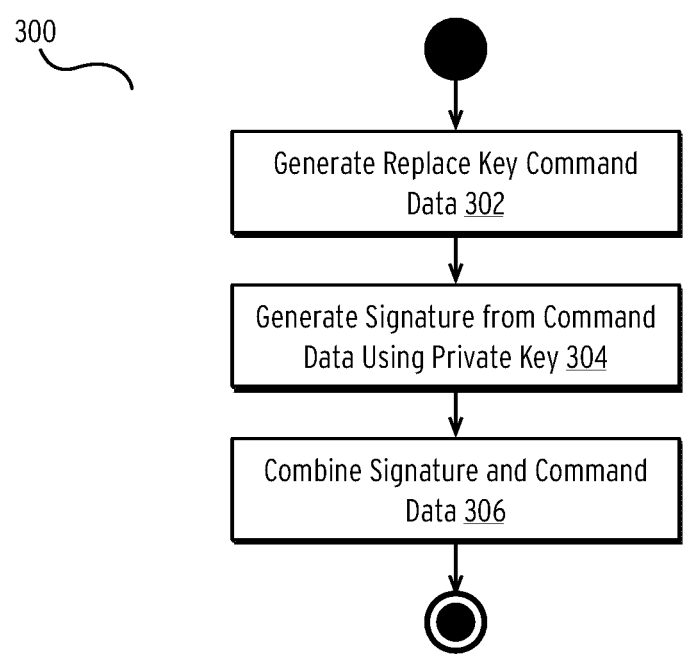
FIG. 3 is a flow diagram illustrating a method for generating a customer signature according to some of the example embodiments.

In an embodiment, the host processor 104 includes key storage 112. In some embodiments, the key storage 112 can comprise a secure storage location (e.g., hardware security module). In other embodiments, the key storage 112 can comprise a file system location for storing cryptographic keys such as public-private key pairs. The host processor 104 additionally includes a command generator 114 configured to generate commands to issue to memory device 102. In some embodiments, the command generator 114 can comprise a dedicated hardware device. In other embodiments, the command generator 114 can comprise a software or firmware routine running on a general-purpose controller or microprocessor. The command generator 114 can generate a replace key command, as described herein, using keys stored in key storage 112. The description of FIG. 3 provides further detail on this operation. In brief, the command generator 114 can read a public key from key storage 112 and combine the public key with other fields. The command generator 114 can then generate a digital signature using the public key and other fields as the input data and a private key stored in key storage 112 corresponding to the public key as the signing key. The command generator 114 can transmit commands to a KMS 106 via a network interface 116. In an embodiment, the command generator 114 can transmit a customer-signed replace key command (e.g., interim command) the KMS 106 for signing by the KMS 106. In this embodiment, the host processor 104 can transmit the interim command to a designated endpoint of the KMS 106 (e.g., a network address). In some embodiments, the host processor 104 can authenticate itself to the KMS 106 via various mechanisms such as username/password authentication. In other embodiments, the KMS 106 can authenticate host processor 104 by validating the signed interim command using a public key. In some embodiments, the KMS 106 can locate this public key via a certificate authority (CA) or another third-party mechanism.

The KMS 106 includes a network interface 124 for receiving commands from the host processor 104. The network interface 124 can forward the commands to a validator 122 for validation. In some embodiments, the validator 122 can read the signature in the command and the public key in the command and validate the signature. In such an embodiment, the validator 122 can thus simulate the acts of memory device 102 prior to the KMS 106 signing the command itself. However, in some embodiments, validator 122 can be optional. After validation (if implemented), a signature generator 120 can generate a server signature. In an embodiment, the signature generator 120 can read a private key from key storage 118 and sign the entire command received from a host processor 104. The signature generator 120 can then insert the server-generated signature into the command and return the command to the host processor 104 via network interface 124. As discussed already, the host processor 104 can then issue the dual-signed command to the memory device 102. Various operational details of memory device 102, host processor 104, and KMS 106 are provided in more detail in the following figures.

Figure 2:
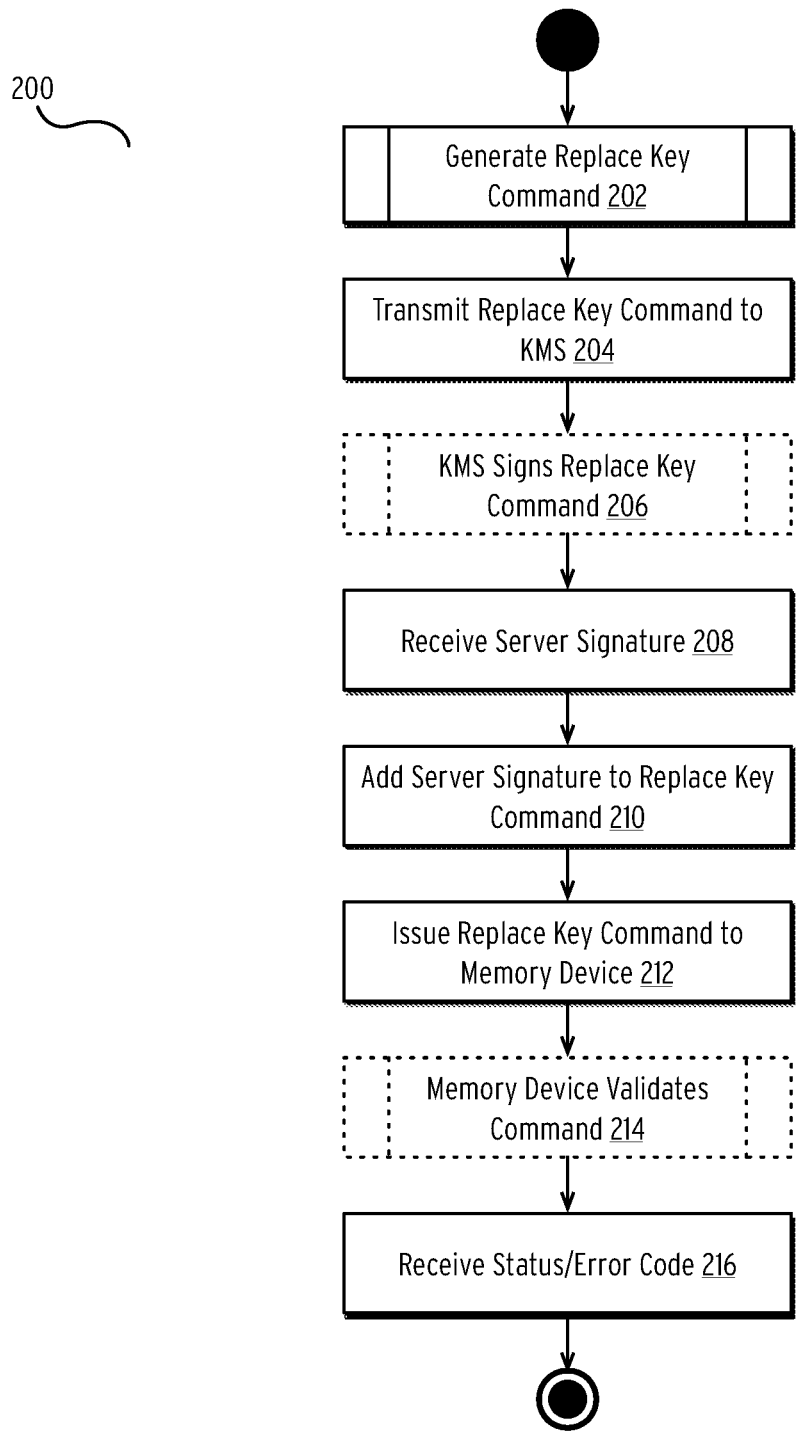
FIG. 2 is a flow diagram illustrating a method for ensuring the update of a key in a memory device according to some of the example embodiments.

FIG. 2 is a flow diagram illustrating a method for ensuring the update of a key in a memory device according to some of the example embodiments.

In block 202, method 200 can include generating an interim replace key command. FIG. 3 provides further details of block 202 and is not repeated herein. In brief, in block 202, method 200 can generate a customer-generated signature, a public key, and zero or more other fields. Method 200 can generate the customer-generated signature using the public key and zero or more other fields as input data and a private key corresponding to the public key as the signing key. Although asymmetric key pairs are used primarily as an example, other cryptographic key types can be used to generate digital signatures throughout the disclosure.

In block 204, method 200 can include transmitting the interim replace key command to a KMS. In some embodiments, the KMS can expose a network endpoint such as a Representation State Transfer (REST) or Remote Procedure Call (RPC) endpoint. In block 204, method 200 can transmit the interim replace key command to the KMS by calling the endpoint. In some embodiments, method 200 can further including logging into the KMS (e.g., via authentication credentials) prior to executing block 204.

Figure 4:
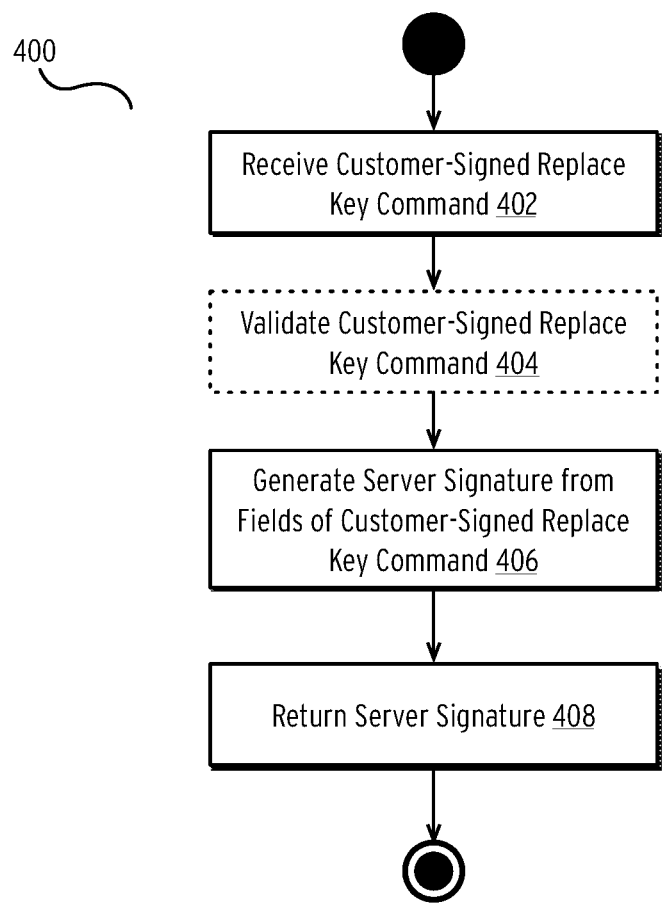
FIG. 4 is a flow diagram illustrating a method for signing a replace key command according to some of the example embodiments.

In block 206, a KMS signs the replace key command. The description of FIG. 4 provides further detail on block 206 and is not repeated herein. In brief, the KMS generates a signature using the interim replace key command as the input data and its own private key. In an embodiment, the KMS can identify a private key that corresponds to a UID in the interim replace key command In general, the KMS can manage a table of UID to private key mappings created during manufacturing and, in some scenarios, updated based on key changes. The KMS can extract the UID from the interim replace key command, load the correct private key, and use the correct private key to generate a signature based on the interim replace key command.

In block 208, method 200 can include receiving a server signature. In an embodiment, the KMS returns only the generated signature to method 200 (e.g., as executed by a host processor 104). In an alternative embodiment, KMS can generate a new replace key command that includes the interim replace key command and the generated server signature. In this embodiment, the KMS can return the entire new replace key command, including both the customer-generated and server-generated signatures. If the KMS returns an entire command, method 200 can bypass block 210.

In block 210, method 200 can include adding the server signature to the replace key command In an embodiment, method 200 can prepend the server signature to the interim replace key command to generate a final replace key command Thus, the final replace key command can include the server-generated signature, the customer-generated signature, the customer public key, and zero or more data fields.

In block 212, method 200 can include issuing the replace key command to a memory device. In an embodiment, method 200 can transmit the final replace key command to the memory device over a data bus and/or interface such as, but not limited to, a non-volatile memory express (NVMe) or Peripheral Component Interconnect Express (PCIe) bus.

In block 214, the memory device validates the replace key command. The description of FIG. 5 provides further detail on block 214 and is not repeated herein. In brief, the memory device can validate both the server-generated and client-generated signatures to ensure that the public key included in the final is properly formed and that the issuer of the final replace key command is authorized to replace the key.

In block 216, method 200 can include receiving a status or error code in response to the replace key command In some embodiments, a status code can comprise an indication that the key in the final replace key command was written, overwriting a previously stored key. For example, the status code can include an enumerated return value. In some embodiments, an error code can comprise an enumerated value indicating why the final replace key command failed. For example, a value of —1 can indicate that the customer signature was invalid, while a value of —2 can indicate that the server signature was invalid.

FIG. 3 is a flow diagram illustrating a method for generating a customer signature according to some of the example embodiments.

In block 302, method 300 can include generating replace key command data.

In an embodiment, block 302 can include generating a cryptographic key. In an embodiment, the cryptographic key can be a public key. In an embodiment, the public key can be associated with a corresponding private. In another embodiment, block 302 can include reading the key (e.g., public key) from a storage area. In such an embodiment, the key can be pre-generated. The key used in block 302 is referred to as the customer cryptographic key or second cryptographic key.

In some embodiments, the replace key command data can include one or more additional fields. For example, the replace key command data can include a request or response flag, configuration data, a write address, a monotonic counter value, a nonce value, or other data fields. The specific type of fields is not limiting. In some embodiments, the combination of a cryptographic key ($PubK_{customer}$) and zero or more other fields (fields) represent the replace key command data (data=[$PK_{customer}$, fields]).

In block 304, method 300 can include generating a signature from the replace key command data using a private key.

In an embodiment, method 300 can utilize a digital signature algorithm such as an RSA, DSA, ECDSA, EdDSA, or another similar algorithm In an embodiment, method 300 uses the replace key command data as the input to the signature algorithm and uses a private key ($PriK_{customer}$) corresponding to the public key ($PubK_{customer}$) in the replace key command data as the signing key. Thus, method 300 can generate a signature as $c_{sign}$=f([$PubK_{customer}$, fields]), where f represents a well-defined signature generation function and $c_{sign}$ represents a digital signature generating using such a function. The specific ordering of fields in the message to f is not limiting, provided it is agreed upon.

In block 306, method 300 can include combining the signature and command data to form the replace key command. In an embodiment, method 300 can concatenate the digital signature generated in block 304 with the replace key command data to generate a replace key command having the form: [$c_{sign}$, $PubK_{customer}$, fields]. This form of the replace key command is alternatively referred to as an interim replace key command.

FIG. 4 is a flow diagram illustrating a method for signing a replace key command according to some of the example embodiments.

In block 402, method 400 can include receiving a customer-signed replace key command. As described above, method 400 can be executed as a server-side application that receives network requests over a well-defined endpoint such as a REST or RPC endpoint. In the illustrated embodiment, the customer-signed replace key command can correspond to the interim replace key command described previously. In some embodiments, the interim replace key command has the form [$c_{sign}$, $PubK_{customer}$, fields] as previously discussed.

In block 404, method 400 can include validating the customer-signed replace key command. As illustrated, block 404 can be optional. If implemented, method 400 can extract the customer signature ($c_{sign}$) and the public key ($PubK_{customer}$) and compute a hash of the values $hash_{given}$=hash([$PubK_{customer}$, fields]), where hash comprises a well-defined hash function. Next, method 400 can decrypt the customer signature ($c_{sign}$) to obtain an expected hash ($hash_{expected}$) Method 400 can then compare the two hashes ($hash_{given}$=$hash_{expected}$) to determine if the customer signature ($c_{sign}$) is valid. If not, method 400 can terminate early and return an error code to the calling party. In this optional embodiment, method 400 can simulate the actions of a memory device and thus preemptively address malformed keys or keys that are modified during network transmission, either maliciously or accidentally.

In block 406, method 400 can include generating a server signature from fields of the customer-signed replaced key command. Method 400 can first load a private key to use for signing. In some embodiments, the fields includes a UID (UID∈fields), where UID can comprise a fixed-length unique identifier of a memory device. Method 400 can query a table of UID to private key (or asymmetric key pair) mappings and load the proper private key.

Next, method 400 can prepare the message for signing. In an embodiment, the message for signing can include the entire interim replace key command ([$c_{sign}$, $PubK_{customer}$, fields]). Thus, in some embodiments, method 400 can compute a server-generated signature ($s_{sign}$) as follows: $s_{sign}$=f([$c_{sign}$, $PubK_{customer}$, fields]). In some embodiments, less than all fields of the interim replace key command can be used, or the ordering of fields can be altered, provided that the memory device is aware of the scheme used to generate the server signature ($s_{sign}$).

In block 408, method 400 can include returning the server signature. In some embodiments, method 400 can return the value of $s_{sign}$ in block 408. In other embodiments, method 400 can return an entire command In such an embodiment, method 400 can prepend the server signature to the interim replace key command to generate a final replace key command structured as follows: [$s_{sign}$, $c_{sign}$, $PubK_{customer}$, fields].

FIG. 5 is a flow diagram illustrating a method for validating a replace key command at a memory device according to some of the example embodiments.

In block 502, method 500 can include receiving a dual-signed replace key command. As discussed previously, the dual-signed replace key may correspond to the final replace key command generated in methods 200 or 400. In one embodiment, the dual-signed replace key command can be of the form [$s_{sign}$, $c_{sign}$, $PubK_{customer}$, fields]. As another example, the following table illustrates one exemplary format of the 516-byte dual-signed replace key command.

TABLE 1

| Position | Size (bytes) | Content |
| --- | --- | --- |
| [1:0] | 2 | Request/response flag indicating the direction of the command |
| [3:2] | 2 | Configuration data (optional) |

TABLE 1-continued

| Position | Size (bytes) | Content |
| --- | --- | --- |
| [7:4] | 4 | Address of cryptographic key to overwrite |
| [15:8] | 8 | Monotonic counter value used to prevent replay attacks |
| [31:16] | 16 | Nonce value used to prevent replay attacks |
| [287:32] | 256 | Data, including customer public key ($PubK_{customer}$) in, for example, the first sixty-four bytes |
| [303:288] | 16 | UID |
| [367:304] | 64 | Customer-generated signature ($c_{sign}$) |
| [431:368] | 64 | Server-generated signature ($s_{sign}$) |
| [511:368] | 144 | Reserved |

The specific sizes, content, and positions are not limiting. As one example, the value of $s_{sign}$ can be split into two 32-byte keys (e.g., s and r ECDSA keys). In the illustrated commands, data in positions [303:288] and [287:97] and [31:0] comprise the fields data discussed previously.

In block 504, method 500 can include validating a customer signature. In an embodiment, method 500 first extracts the customer signature ($c_{sign}$) and the customer public key ($PubK_{customer}$) from the dual-signed replace key command Next, method 500 generates a message to hash from the dual-signed replace key command. As discussed above, the message can include the customer public key ($PubK_{customer}$) and the fields. Using the command in Table 1 as an example, the message can include bytes at positions [303:0]. Thus, method 500 computes an obtained hash ($hash_{obtained}$=hash([$PubK_{customer}$, fields]), where hash represents a well-defined hash function. In some embodiments, the dual-signed replace key command is formatted such that all bytes forming the message can be read contiguously.

Next, to validate the message, method 500 can decrypt the customer signature ($c_{sign}$) to obtain an expected hash ($hash_{expected}$) using the customer public key ($PubK_{customer}$) and an agreed-upon signature validation algorithm (e.g., ECDSA, EdDSA, RSA, DSA, etc.). If the two hashes are equal, the validation passes. If the two hashes are not equal, the validation fails.

In block 506, method 500 can branch based on whether the customer signature is valid. If not, method 500 can proceed to block 514, which can include returning an error code. In some embodiments, the error code can indicate that the client-generated signature is invalid. In such a scenario, the customer-provided public key used to validate the client-generated signature may be corrupted or otherwise malformed. Thus, the host processor can use this error code to trigger a new key generation process or otherwise handle such an error condition. Alternatively, if method 500 determines that the customer signature is valid, method 500 can proceed to block 508.

In block 508, method 500 can include validating a server signature. The specific cryptographic operations in block 508 are similar to that of block 504 and are not repeated herein. However, the underlying messages in block 508 are different than that in block 504. Specifically, the underlying message used to generate $hash_{obtained}$ is formed using the customer public key ($PubK_{customer}$), the zero or more fields (fields) an the customer-generated signature ($c_{sign}$). Further, $s_{sign}$ is decrypted using the currently stored public key (e.g., in the address identified by the dual-signed replace key command) to obtain $hash_{expected}$ As in block 504, if the two hashes are equal, the validation passes. If the two hashes are not equal, the validation fails.

In block 510, method 500 can include determining if the server signature is valid. If not, method 500 can proceed to block 514 which can include returning an error code. In some embodiments, the error code can indicate that the server-generated signature is invalid. In such a scenario, the host processor may not be authorized to change the key since the server did not "approve" the request via a server signature. Thus, the memory device can prevent the overwriting of the current cryptographic key if the server validation fails. Alternatively, if method 500 determines that the customer signature is valid, method 500 can proceed to block 516.

In block 512, method 500 can include overwriting a current cryptographic key with the new cryptographic key in the dual-signed replace key command. In an embodiment, method 500 can identify a memory address in which to write the new cryptographic key. In some embodiments, the new cryptographic key can be written to the memory address, overwriting a currently stored key. Since the server validation in block 508 is performed using the public key currently stored at the memory address, method 500 can implicitly confirm that the proper key is being overwritten with a valid key, thus preventing disabling the memory device.

In block 516, method 500 can include returning a success status code. In some embodiments, a success status code can comprise an indication that the key in the final replace key command was written, overwriting a previously stored key. For example, the success status code can include an enumerated return value.

Figure 6:
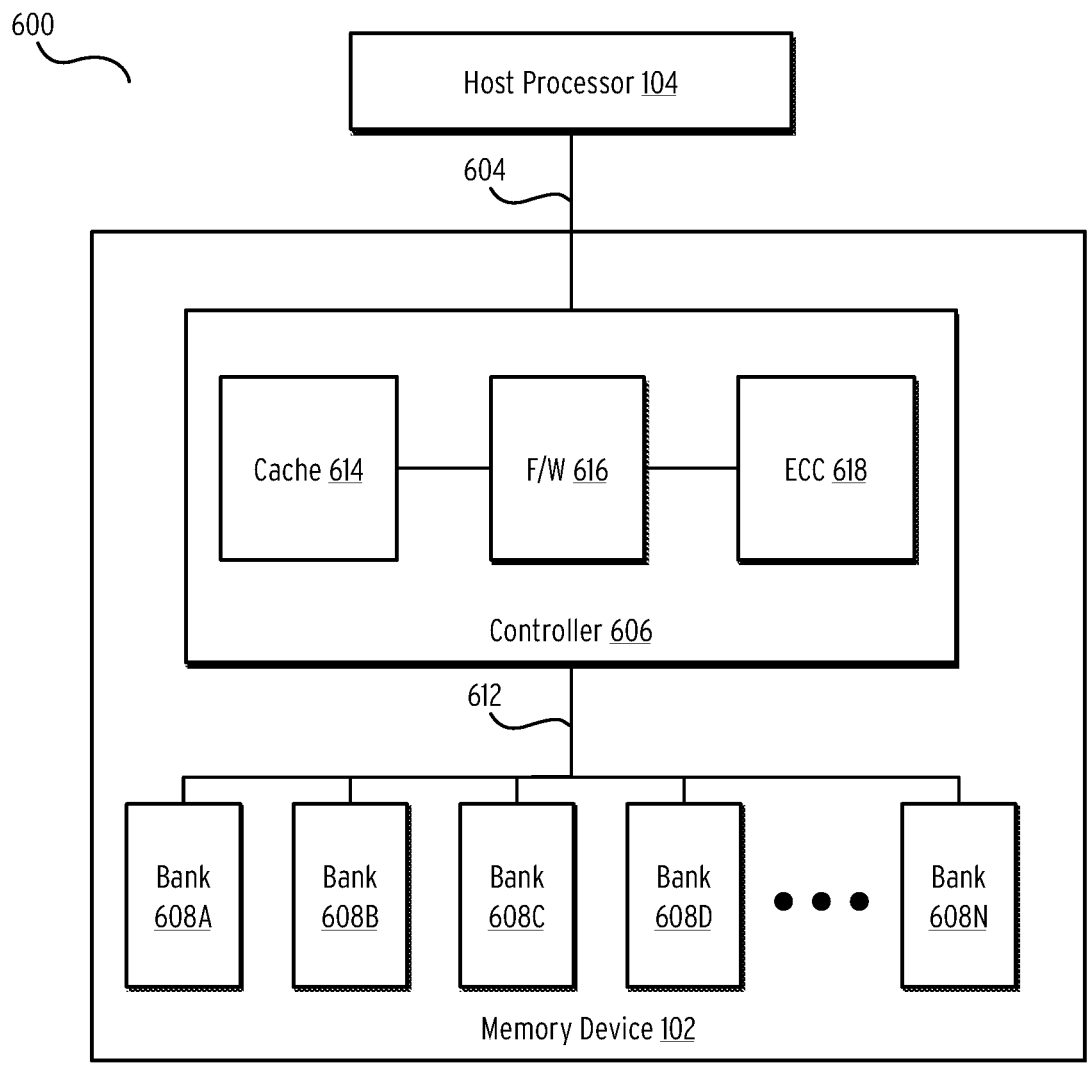
FIG. 6 is a block diagram illustrating a memory system according to some of the example embodiments.

FIG. 6 is a block diagram illustrating a memory system according to some embodiments of the disclosure.

As illustrated in FIG. 6, a computing system 600 includes a host processor 104 communicatively coupled to a memory device 102 via a bus 604. The memory device 102 comprises a controller 606 communicatively coupled to one or more memory banks (e.g., bank 608A, bank 608B, bank 608C, bank 608D, bank 608N, etc.) forming a memory array via an interface 612. As illustrated, the controller 606 includes a local cache 614, firmware 616, and an ECC module 618.

In the illustrated embodiment, host processor 104 can comprise any type of computer processor, such as a central processing unit (CPU), graphics processing unit (GPU), or other types of general-purpose or special-purpose computing devices. The host processor 104 includes one or more output ports that allow for the transmission of address, user, and control data between the host processor 104 and the memory device 102. In the illustrated embodiment, this communication is performed over the bus 604. In one embodiment, the bus 604 comprises an input/output (I/O) bus or a similar type of bus.

The memory device 102 is responsible for managing one or more memory banks (e.g., bank 608A, bank 608B, bank 608C, bank 608D, bank 608N, etc.). In one embodiment, the memory banks (e.g., bank 608A, bank 608B, bank 608C, bank 608D, bank 608N, etc.) comprise NAND Flash dies or other configurations of non-volatile memory. In one embodiment, the memory banks (e.g., bank 608A, bank 608B, bank 608C, bank 608D, bank 608N, etc.) comprise a memory array.

The memory banks (e.g., bank 608A, bank 608B, bank 608C, bank 608D, bank 608N, etc.) are managed by the controller 606. In some embodiments, the controller 606 comprises a computing device configured to mediate access to and from banks (e.g., bank 608A, bank 608B, bank 608C, bank 608D, bank 608N, etc.). In one embodiment, the controller 606 comprises an ASIC or other circuitry installed on a printed circuit board housing the memory banks (e.g., bank 608A, bank 608B, bank 608C, bank 608D, bank 608N, etc.). In some embodiments, the controller 606 may be physically separate from the memory banks (e.g., bank 608A, bank 608B, bank 608C, bank 608D, bank 608N, etc.). The controller 606 communicates with the memory banks (e.g., bank 608A, bank 608B, bank 608C, bank 608D, bank 608N, etc.) over the interface 612. In some embodiments, this interface 612 comprises a physically wired (e.g., traced) interface. In other embodiments, the interface 612 comprises a standard bus for communicating with memory banks (e.g., bank 608A, bank 608B, bank 608C, bank 608D, bank 608N, etc.).

The controller 606 comprises various modules including local cache 614, firmware 616 and ECC module 618. In one embodiment, the various modules (e.g., local cache 614, firmware 616 and ECC module 618) comprise various physically distinct modules or circuits. In other embodiments, the modules (e.g., local cache 614, firmware 616 and ECC module 618) may completely (or partially) be implemented in software or firmware.

As illustrated, firmware 616 comprises the core of the controller and manages all operations of the controller 606. The firmware 616 may implement some or all of the methods described above. Specifically, the firmware 616 may implement the methods described in the foregoing figures.

Figure 7:
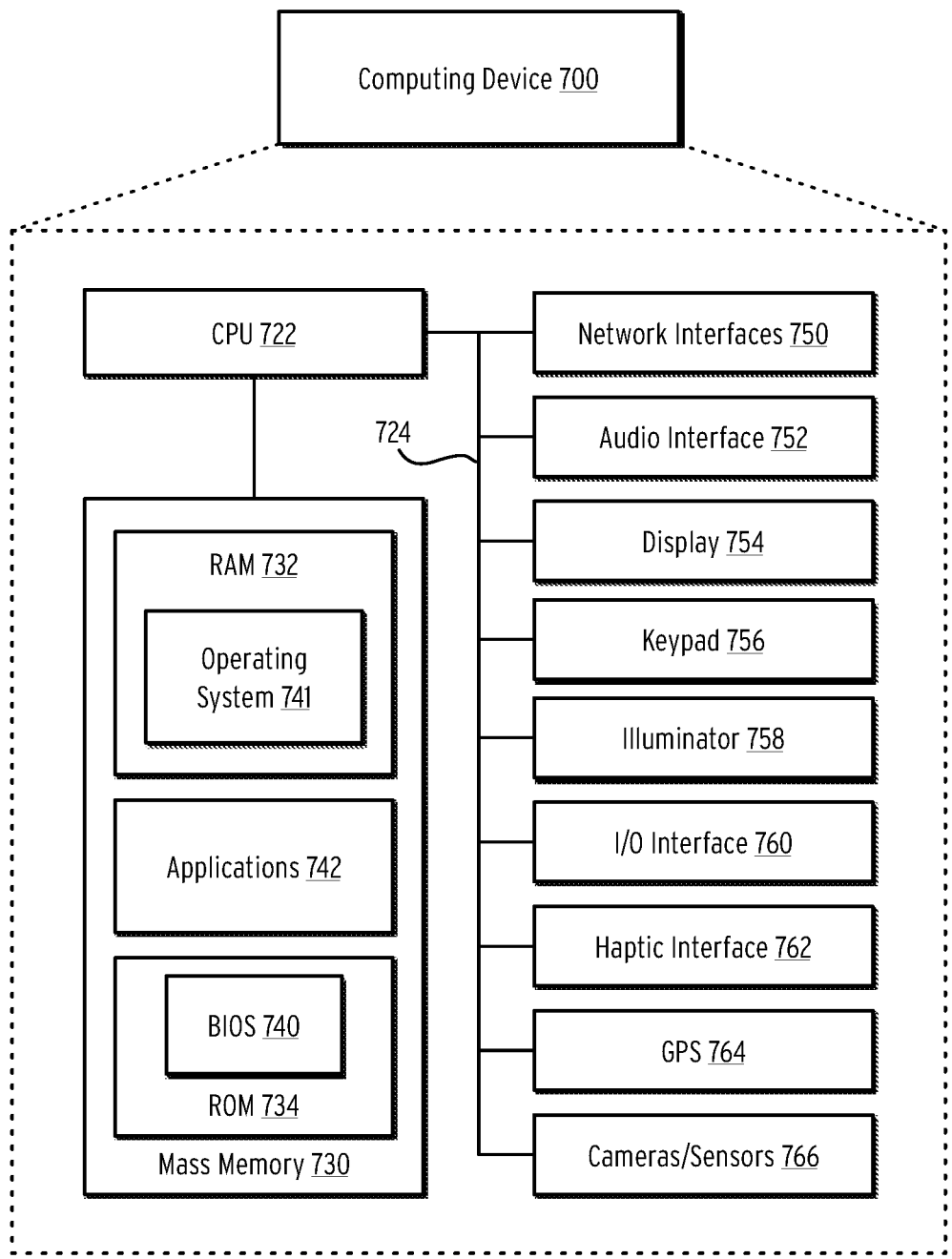
FIG. 7 is a block diagram illustrating a computing device showing an example embodiment of a computing device according to some of the example embodiments.

FIG. 7 is a block diagram illustrating a computing device 700 showing an example embodiment of a computing device used in the various embodiments of the disclosure.

The computing device 700 may include more or fewer components than those shown in FIG. 7. For example, a server computing device may not include audio interfaces, displays, keypads, illuminators, haptic interfaces, GPS receivers, cameras, or sensors.

As shown in the figure, the computing device 700 includes a processing unit such as CPU 722 in communication with a mass memory 730 via a bus 724. The computing device 700 also includes one or more network interfaces 750, an audio interface 752, a display 754, a keypad 756, an illuminator 758, an input/output interface 760, a haptic interface 762, a Global Positioning System transceiver (GPS transceiver 764) and one or more sensors 766, such as cameras or other optical, thermal, or electromagnetic. The positioning of the one or more sensors 766 on the computing device 700 can change per computing device 700 model, per computing device 700 capabilities, and the like, or some combination thereof.

The computing device 700 may optionally communicate with a base station (not shown) or directly with another computing device. A network interface is sometimes known as a transceiver, transceiving device, or network interface card (NIC).

The audio interface 752 produces and receives audio signals such as the sound of a human voice. For example, the audio interface 752 may be coupled to a speaker and microphone (not shown) to enable telecommunication with others or generate an audio acknowledgment for some action. Display 754 may be a liquid crystal display (LCD), gas plasma, light-emitting diode (LED), or any other type of display used with a computing device. Display 754 may also include a touch-sensitive screen arranged to receive input from an object such as a stylus or a digit from a human hand.

Keypad 756 may comprise any input device arranged to receive input from a user. Illuminator 758 may provide a status indication or provide light.

The computing device 700 also comprises input/output interface 760 for communicating with external devices, using communication technologies, such as USB, infrared, Bluetooth™, or the like. The haptic interface 762 provides tactile feedback to a user of the client device.

The GPS transceiver 764 can determine the physical coordinates of the computing device 700 on the surface of the Earth, which typically outputs a location as latitude and longitude values. GPS transceiver 764 can also employ other geo-positioning mechanisms, including, but not limited to, triangulation, assisted GPS (AGPS), E-OTD, CI, SAI, ETA, BSS, or the like, to further determine the physical location of the computing device 700 on the surface of the Earth. In one embodiment, however, the computing device 700 may, through other components, provide other information that may be employed to determine a physical location of the device, including, for example, a MAC address, Internet Protocol (IP) address, or the like.

Mass memory 730 includes a RAM 732, a ROM 734, and other storage means. Mass memory 730 illustrates another example of computer storage media for storage of information such as computer-readable instructions, data structures, program modules, or other data. Mass memory 730 stores a basic input/output system (BIOS 740) for controlling the low-level operation of the computing device 700. The mass memory also stores an operating system 741 for controlling the operation of the computing device 700.

Applications 742 may include computer-executable instructions which, when executed by the computing device 700, perform any of the methods (or portions of the methods) described previously in the description of the preceding Figures. In some embodiments, the software or programs implementing the method embodiments can be read from hard disk drive (not illustrated) and temporarily stored in RAM 732 by CPU 722. CPU 722 may then read the software or data from RAM 732, process them, and store them to RAM 732 again.

The disclosure includes various devices which perform the methods and implement the systems described above, including data processing systems which perform these methods, and computer-readable media containing instructions which, when executed on data processing systems, cause the systems to perform these methods.

The description and drawings are illustrative and are not to be construed as limiting. Numerous specific details are described to provide a thorough understanding. However, in certain instances, well-known or conventional details are not described in order to avoid obscuring the description. References to "one" or "an" embodiment in the present disclosure do not necessarily reference the same embodiment and such references mean at least one.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described, which may be requirements for some embodiments, but not other embodiments.

In this description, various functions and operations may be described as being performed by or caused by software code to simplify description. However, those skilled in the art will recognize what is meant by such expressions is that the functions result from the execution of the code by one or more processors, such as a microprocessor, Application-Specific Integrated Circuit (ASIC), graphics processor, or a Field-Programmable Gate Array (FPGA). Alternatively, or in combination, the functions and operations can be implemented using special-purpose circuitry (e.g., logic circuitry), with or without software instructions. Embodiments can be implemented using hardwired circuitry without software instructions or in combination with software instructions. Thus, the techniques are not limited to any specific combination of hardware circuitry and software, nor to any particular source for the instructions executed by a computing device.

While some embodiments can be implemented in fully functioning computers and computer systems, various embodiments are capable of being distributed as a computing product in a variety of forms and are capable of being applied regardless of the particular type of machine or computer-readable media used to effect distribution.

At least some aspects disclosed can be embodied, at least in part, in software. That is, the techniques may be carried out in a computing device or other system in response to its processor, such as a microprocessor, executing sequences of instructions contained in a memory, such as ROM, volatile RAM, non-volatile memory, cache, or a remote storage device.

Routines executed to implement the embodiments may be implemented as part of an operating system, middleware, service delivery platform, SDK (Software Development Kit) component, web services, or other specific application, component, program, object, module, or sequence of instructions referred to as "computer programs." Invocation interfaces to these routines can be exposed to a software development community as an API (Application Programming Interface). The computer programs typically comprise one or more instructions set at various times in various memory and storage devices in a computer, and that, when read and executed by one or more processors in a computer, cause the computer to perform operations necessary to execute elements involving the various aspects.

A machine-readable medium can be used to store software and data which, when executed by a computing device, causes the device to perform various methods. The executable software and data may be stored in various places, including, for example, ROM, volatile RAM, non-volatile memory, or cache. Portions of this software or data may be stored in any one of these storage devices. Further, the data and instructions can be obtained from centralized servers or peer to peer networks. Different portions of the data and instructions can be obtained from different centralized servers or peer to peer networks at different times and in different communication sessions or in the same communication session. The data and instructions can be obtained in entirety prior to the execution of the applications. Alternatively, portions of the data and instructions can be obtained dynamically, just in time, when needed for execution. Thus, it is not required that the data and instructions be on a machine-readable medium in entirety at a particular instance of time.

Examples of computer-readable media include but are not limited to recordable and non-recordable type media such as volatile and non-volatile memory devices, read-only memory (ROM), random access memory (RAM), flash memory devices, solid-state drive storage media, removable disks, magnetic disk storage media, optical storage media (e.g., Compact Disk Read-Only Memory (CD ROMs), Digital Versatile Disks (DVDs), etc.), among others. The computer-readable media may store the instructions.

In general, a tangible or non-transitory machine-readable medium includes any mechanism that provides (e.g., stores) information in a form accessible by a machine (e.g., a computer, mobile device, network device, personal digital assistant, manufacturing tool, any device with a set of one or more processors, etc.).

In various embodiments, hardwired circuitry may be used in combination with software and firmware instructions to implement the techniques. Thus, the techniques are neither limited to any specific combination of hardware circuitry and software nor to any particular source for the instructions executed by a computing device.

Various embodiments set forth herein can be implemented using a wide variety of different types of computing devices. As used herein, examples of a "computing device" include, but are not limited to, a server, a centralized computing platform, a system of multiple computing processors or mobile devices, a user terminal, a vehicle, a personal communications device, a wearable digital device, an electronic kiosk, a general-purpose computer, an electronic document reader, a tablet, a laptop computer, a smartphone, a digital camera, a residential, domestic appliance, a television, or a digital music player. Additional examples of computing devices include devices that are part of what is called "the internet of things" (IoT). Such "things" may have occasional interactions with their owners or administrators, who may monitor the things or modify settings on these things. In some cases, such owners or administrators play the role of users with respect to the "thing" devices. In some examples, the primary mobile device (e.g., an Apple iPhone) of a user may be an administrator server with respect to a paired "thing" device that is worn by the user (e.g., an Apple watch).

In some embodiments, the computing device can be a computer or host system, which is implemented, for example, as a desktop computer, laptop computer, network server, mobile device, or another computing device that includes a memory and a processing device. The host system can include or be coupled to a memory subsystem so that the host system can read data from or write data to the memory subsystem. The host system can be coupled to the memory subsystem via a physical host interface. In general, the host system can access multiple memory subsystems via the same communication connection, multiple separate communication connections, and/or a combination of communication connections.

In some embodiments, the computing device is a system including one or more processing devices. Examples of the processing device can include a microcontroller, a central processing unit (CPU), special purpose logic circuitry (e.g., a field-programmable gate array (FPGA), an application-specific integrated circuit (ASIC), etc.), a system on a chip (SoC), or another suitable processor.

Although some of the drawings illustrate a number of operations in a particular order, operations which are not order-dependent may be reordered, and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software, or any combination thereof.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A memory device comprising:
   a storage array, the storage array storing a first cryptographic key; and
   a processor configured to:
      receive a command from a host processor, the command including a second cryptographic key, a first signature, a second signature, and at least one field,
      determine that the first signature is valid using the second cryptographic key and the at least one field,
         determine that the second signature is valid using the first cryptographic key, the first signature and the at least one field, and
         replace the first cryptographic key with the second cryptographic key after determining that both the first signature and second signature are valid.

2. The memory device of claim 1, wherein determining that the first signature is valid comprises computing a first hash using the second cryptographic key and the at least one field, decrypting the first signature using the second cryptographic key to generate a second hash, and determining that the first signature is valid when the first hash and second hash are equal.

3. The memory device of claim 1, wherein determining that the second signature is valid comprises computing a first hash using the second cryptographic key, the at least one field, and the first signature, decrypting the second signature using the first cryptographic key to generate a second hash, and determining that the second signature is valid when the first hash and second hash are equal.

4. The memory device of claim 1, wherein the processor is further configured to return an error code after determining that either the first signature is invalid or the second signature is invalid.

5. The memory device of claim 4, wherein the processor is further configured to prevent overwriting of the first cryptographic key after returning the error code.

6. The memory device of claim 4, wherein the error code indicates whether the first signature or the second signature is invalid.

7. The memory device of claim 1, wherein the first cryptographic key comprise a first public key and second cryptographic key comprises a second public key.

8. A method comprising:
   storing, in a storage array, a first cryptographic key;
   receiving a command from a host processor, the command including a second cryptographic key, a first signature, a second signature, and at least one field;
   determining that the first signature is valid using the second cryptographic key and the at least one field;
   determining that the second signature is valid using the first cryptographic key, the first signature and the at least one field; and
   replacing the first cryptographic key with the second cryptographic key after determining that both the first signature and second signature are valid.

9. The method of claim 8, wherein determining that the first signature is valid comprises computing a first hash using the second cryptographic key and the at least one field, decrypting the first signature using the second cryptographic key to generate a second hash, and determining that the first signature is valid when the first hash and second hash are equal.

10. The method of claim 8, wherein determining that the second signature is valid comprises computing a first hash using the second cryptographic key, the at least one field, and the first signature, decrypting the second signature using the first cryptographic key to generate a second hash, and determining that the second signature is valid when the first hash and second hash are equal.

11. The method of claim 8, further comprising returning an error code after determining that either the first signature is invalid or the second signature is invalid.

12. The method of claim 11, further comprising preventing overwriting of the first cryptographic key after returning the error code.

13. The method of claim 11, wherein the error code indicates whether the first signature or the second signature is invalid.

14. The method of claim 8, wherein the first cryptographic key comprise a first public key and second cryptographic key comprises a second public key.

15. A non-transitory computer-readable storage medium for tangibly storing computer program instructions capable of being executed by a computer processor, the computer program instructions defining steps of:
    storing, in a storage array, a first cryptographic key;
    receiving a command from a host processor, the command including a second cryptographic key, a first signature, a second signature, and at least one field;
    determining that the first signature is valid using the second cryptographic key and the at least one field;
    determining that the second signature is valid using the first cryptographic key, the first signature and the at least one field; and
    replacing the first cryptographic key with the second cryptographic key after determining that both the first signature and second signature are valid.

16. The non-transitory computer-readable storage medium of claim 15, wherein determining that the first signature is valid comprises computing a first hash using the second cryptographic key and the at least one field, decrypting the first signature using the second cryptographic key to generate a second hash, and determining that the first signature is valid when the first hash and second hash are equal.

17. The non-transitory computer-readable storage medium of claim 15, wherein determining that the second signature is valid comprises computing a first hash using the second cryptographic key, the at least one field, and the first signature, decrypting the second signature using the first cryptographic key to generate a second hash, and determining that the second signature is valid when the first hash and second hash are equal.

18. The non-transitory computer-readable storage medium of claim 15, the steps further comprising returning an error code after determining that either the first signature is invalid or the second signature is invalid.

19. The non-transitory computer-readable storage medium of claim 18, the steps further comprising preventing overwriting of the first cryptographic key after returning the error code.

20. The non-transitory computer-readable storage medium of claim 18, wherein the error code indicates whether the first signature or the second signature is invalid.

* * * * *